US012748216B2

(12) United States Patent
Zamora

(10) Patent No.: US 12,748,216 B2
(45) Date of Patent: Sep. 29, 2026

(54) GNSS POSITIONING

(71) Applicant: u-blox AG, Thalwil (CH)

(72) Inventor: Jesus Zamora, Zürich (CH)

(73) Assignee: u-blox AG, Thalwil (CH)

( * ) Notice: Subject to any disclaimer, the term of this patent is extended or adjusted under 35 U.S.C. 154(b) by 218 days.

(21) Appl. No.: 18/636,924

(22) Filed: Apr. 16, 2024

(65) Prior Publication Data

US 2024/0353572 A1 Oct. 24, 2024

(30) Foreign Application Priority Data

Apr. 20, 2023 (EP) .................................... 23169058

(51) Int. Cl.
*G01S 19/22* (2010.01)
*G01S 19/32* (2010.01)

(52) U.S. Cl.
CPC .............. *G01S 19/22* (2013.01); *G01S 19/32* (2013.01)

(58) Field of Classification Search
CPC ................................ G01S 19/22; G01S 19/32
See application file for complete search history.

(56) References Cited

U.S. PATENT DOCUMENTS 5,917,445 A * 6/1999 Schipper ................ G01S 19/22 701/478.5
8,427,367 B2 4/2013 France et al.
2005/0114023 A1* 5/2005 Williamson ............ G01S 19/23 701/472
2009/0079626 A1* 3/2009 Kobayashi .............. G01S 19/32 342/357.74
2010/0103039 A1* 4/2010 van Diggelen ......... G01S 19/33 342/357.73
2011/0080318 A1* 4/2011 Alizadeh-Shabdiz ...................... G01S 19/426 342/357.31
2018/0011198 A1* 1/2018 Zalewski ................ G01S 19/22
2020/0132855 A1* 4/2020 Lee ......................... G01S 19/22
(Continued)

OTHER PUBLICATIONS

Extended European Search Report in European Appln. No. 23169058.7, mailed on Nov. 9, 2023, 7 pages.
(Continued)

*Primary Examiner* — Cassi J Galt
(74) *Attorney, Agent, or Firm* — Fish & Richardson P.C.

(57) ABSTRACT

A method of mitigating multipath interference in a global navigation satellite system (GNSS) includes receiving GNSS signals from a plurality of space vehicles emitting at least L5 and L1/L2 band signals, determining, for each L5 and L1 and/or L2 signal, a pseudo-range based on the signal, and determining a residual for each L5 and L1 and/or L2 signal from each space vehicle, wherein the residual is the difference between the range of the space vehicle to the position predicted based on data from a previous time period and the pseudo-range. The method further includes determining a statistic based a comparison between residuals of the L1 and/or L2 signals and the residuals of the L5 signals. If the statistic is above a predetermined threshold, the overall position is determined based on a subset of the signals, the subset comprising the L5 signals and wherein at least one of the L1 and/or L2 signals are excluded from the subset. If the statistic is not above a predetermined threshold, the position is determined based on the L1 and/or L2 signals and the L5 signals.

20 Claims, 4 Drawing Sheets

(56) References Cited

U.S. PATENT DOCUMENTS

| | | | | |
|---|---|---|---|---|
| 2021/0132236 | A1* | 5/2021 | Cookman | G01S 19/24 |
| 2022/0137234 | A1* | 5/2022 | Syrjärinne | G01S 19/32 342/357.61 |
| 2024/0147408 | A1* | 5/2024 | Peng | H04W 64/00 |

OTHER PUBLICATIONS

Pirsiavash, "GNSS Signal and Measurement Quality Monitoring for Multipath Detection and Mitigation," University of Calgary, Schulich School of Engineering, Schulich School of Engineering & Publications, Aug. 2019, 30 pages.

* cited by examiner

GNSS POSITIONING

CROSS-REFERENCE TO RELATED APPLICATION(S)

This application claims priority to European Application No. 23169058.7, filed on Apr. 20, 2023, the contents of which are incorporated herein by reference in their entirety.

FIELD OF THE INVENTION

The present invention relates to the field of global navigation satellite systems (GNSS). More particularly, the present invention relates to the field of mitigating multipath interference in GNSS.

BACKGROUND OF THE INVENTION

GNSS is a satellite navigation system which utilizes signals transmitted from one or more constellations of satellites orbiting the earth. GNSS receivers are configured to receive the satellite signals and process them to determine a navigation solution. Such a navigation solution generally includes the position and velocity of the receiver as well as precise time. This can be referred to as Position, Velocity and Time or PVT. GNSS has proven to be highly accurate. However, because GNSS signals are electromagnetic, they can be blocked by objects such as mountains, tall buildings, and dense foliage.

Multipath is a major error source for GNSS receivers and can occur in situations where the direct GNSS signal is blocked and only a reflected satellite signal is received by the antenna of a GNSS receiver. However multipath effects can also occur when GNSS signals transmitted by a particular satellite travel by two or more paths to the GNSS receiver's antenna. In such situations, known as multipath interference, the GNSS receiver intercepts a direct or line-of-sight (LOS) component together with one or more non-line-of-sight (NLOS) components. The latter can be caused by the signals being reflected from objects such as mountains or buildings. The signals travelling different paths can experience fading and phase shifting which can cause measurement errors and/or compromise the correlation function shape used to estimate the time delay when processing the GNSS signals. In some environments, such as urban canyon environments, the GNSS signals can be subjected to a significant amount of multipath interference which can result in significant GNSS measurement errors.

A typical approach for mitigating multipath interference in GNSS involves detection and correction of individual affected navigation measurements. Typically, this is done during a signal processing stage. Such an approach may not always perform well. For example, heavy multipath interference tends to distort measurements in ways that are difficult to model reliably. Therefore, if the signals are severely degraded or if assumptions about properties of the degraded signals, such as uniformity of phase error, are not accurate, detection and correction of individual measurements may not yield accurate results.

What is needed, therefore, is an improved technique for mitigating multipath interference in GNSS.

SUMMARY OF THE INVENTION

It would be desirable to provide a method of mitigating a multipath signal. There is a plurality of different GNSS signals, each with different characteristics based on, inter alia, their chipping rate and their spread spectrum. Due to the differing characteristics, some signals are more resilient to multipath interference because it is easier to distinguish between different portions of the signal.

Thus, some signals may be more resilient to multipath interference: if there is a large difference between data from these signals and data from those signals known (due to their characteristics) to be less resilient to multipath interference it may indicate that multipath interference is occurring. In these situations, one or more of the signals less resilient to multipath interference may be excluded from the calculation of the position.

The method uses data from a previous epoch (or time period) to predict the position during the current epoch. The range from the predicted position is compared to the pseudo-range based on an individual signal from a space vehicle: this is known as the residual. If a signal is affected by multipath interference there may be a greater discrepancy between the predicted position (or range based on the predicted position) and the measured position (or pseudo-range) than there would be if the signal is not affected by multipath.

By comparing the residuals of signals known to be more resilient to multipath interference and those known to be less resilient to multipath interference it is possible to infer the likelihood that there is multipath interference.

L5 signals are known to be resilient to multipath interference due to their faster chipping rate. On the other hand, L1 and L2 signals are more susceptible to multipath interference because of their slower chipping rates.

The invention is defined by the claims. According to a first aspect, there is provided a method of mitigating multipath interference in a global navigation satellite system, GNSS, receiver, the method comprising:

- receiving GNSS signals from a plurality of space vehicles which emit at least an L5 signal and an L1 and/or L2 band signal;
- determining, for each L5 signal and L1 and/or L2 signal, a pseudo-range based on the signal;
- determining a residual for each L5 signal and L1 and/or L2 signal from each space vehicle, wherein the residual is the difference the pseudo-range and an estimated measurement to the space vehicle based on data from a previous time period;
- determining a statistic based on a comparison between residuals of the L1/L2 signals and the residuals of the L5 signals;
- determining the position based on a subset of the signals if the statistic is above a predetermined threshold and determining an overall position based on at least the L1 and/or L2 signals and the L5 signals if the statistic is not above a predetermined threshold, the subset comprising the L5 signals and wherein at least one of the L1 and/or L2 signals are excluded from the subset.

The present invention therefore provides a method to identify the likelihood of a location being affected by multipath interference. If it is determined that a location is likely to be affected by multipath interference, then a position can be determined based on signals known to be less affected by multipath interference. Thus, the position determination may be made using only a subset of signals, excluding at least one L1 and/or L2 signal. In this way, the effects of multipath interference are mitigated and improved GNSS positioning is achieved.

In this matter, the term "statistic" refers to mathematically generated result/s, e.g. distribution/s, wherein said result/s may be presented as absolute or discrete value/s or value/s relative to the predetermined limit or threshold (or to another one). The result/s may also be dependent on other variables, which are not part of the comparison between the previously mentioned residuals and/or which are variables of said residuals.

Optionally, L1 and/or L2 signals from space vehicles from which there is also an L5 signal are excluded from the subset used to determine position. L5 signals from these space vehicles will already be used in the position determination so the exclusion of the corresponding L1 and/or L2 signal does not reduce the number of space vehicles used in the position determination.

Alternatively, L1 and/or L2 signals from space vehicles from which there is also a L5 signal are excluded from the subset if the difference between the L1 and/or L2 signal residual and the L5 residual is greater than a predetermined individual distance threshold.

There are some space vehicles which only transmit L1 and/or L2 signals, known to be less resilient to multipath interference, and no L5 signal. Optionally, these signals may be excluded from the subset used to determine the position.

If a multipath environment is detected using the method above, L1 and/or L2 signals from space vehicles without an L5 signal are excluded from the subset when their residual is above a predetermined individual residual threshold. Thus, only signals for which there is a large discrepancy between the predicted position and the determined position are excluded. The other signals, for which there is not a large discrepancy, may be used. Generally, the more space vehicles that are used in the position determination the greater the resulting accuracy.

If a multipath environment is detected the method may further comprise determining an elevation angle for L1 and/or L2 signals from space vehicles without an L5 signal are excluded from the subset if the angle of elevation of the corresponding space vehicle is below a predetermined elevation threshold. Lower angles of elevation are more likely to be affected by multipath interference, so this provides a way to identify which L1 and/or L2 signals (for which there is no corresponding L5 signal) are more likely to be affected by multipath interference.

Determining the statistic may comprise:

- determining a ratio of the residual for the L1 and/or L2 signal to the residual for the L5 signal from the same space vehicle for each space vehicle;
- determining whether the ratio of residuals is over a predetermined ratio threshold for each space vehicle;
- determining whether percentage of space vehicles having a ratio over the predetermined ratio threshold is greater than a predetermined percentage threshold.

Thus, if the over a predetermined percentage of the signals have been deemed likely to be affected by multipath interference, then the position is deemed to be a position affected by multipath interference. Mitigation, by determining the position based only on a subset of signals can then occur.

Additionally or alternatively the statistic may be based on an aggregate across all the signals of a particular type. An example of this is where determining the statistic may comprise:

- determining an average residual for all the L1 and/or L2 signals;
- determining an average residual for all the L5 signals;
- determining whether the difference between the residual for all the L1 and/or L2 signals and the average residual for all the L5 signals is greater than a predetermined average distance difference threshold.

The statistic may not be a direct comparison between residuals and may comprise other data. An example of this is the use of the standard deviation of the residuals. According to an embodiment determining the statistic may comprise:

- determining the standard deviation of the residuals;
- determining whether the standard deviation is above a predetermined standard deviation threshold.

The method described above may be used if the number of space vehicles exceeds a predetermined threshold. If the number of space vehicles is less than a predetermined threshold, then there may be insufficient space vehicles for the method described above to be statistically significant. According to the invention there is a method of determining an overall position comprising:

- determining the number of space vehicles transmitting a L5 and a L1 and/or L2 signal;
- responsive to the number of space vehicles begin greater than a predetermined space vehicle number threshold carrying out a method as described above.

Thus, if the number of space vehicles is above a predetermined space vehicle number threshold the overall position is determined as described above; and

- if the number of space vehicles is below a predetermined space vehicle number threshold determining the overall position based on an estimated position from all the signals.

Optionally, a method of determining an overall position comprises:

- determining a dilution of precision of space vehicles;
- responsive to the dilution of precision being below a predetermined dilution of precision threshold carrying out a method according to any one of the preceding claims.

If the dilution of precision is below a predetermined dilution of precision threshold the overall position is determined according to a method as described above; and

- if the dilution of precision is above a predetermined threshold determining the overall position based on an estimated position from all the signals.

If the residuals are very large i.e., there is a large position error then the method described above may not be performed as there may be other underlying reasons causing the large residuals and the method would therefore not be suitable. According to the invention there is a method according to any one of the preceding claims further comprising: comparing each residual to a maximum threshold;

- responsive to the residual being below the maximum threshold carrying out the steps of determining a statistic and determining the position.

Thus, if the average of all residuals is above a maximum average residual value the overall position is determined based on the estimated position from all the signals; and

- if the average of all residuals is below a maximum average residual value the overall position is determined according to any one of the preceding claims.

Also provided is a GNSS receiver comprising:

- a signal processing unit, configured to track GNSS signals and produce GNSS measurements from the GNSS signals; and
- at least one processor, configured to:
  - determine, for each L5 signal and L1 and/or L2 signal, a pseudo-range based on the signal;
  - determine a residual for each L5 signal and L1 and/or L2 signal from each space vehicle, wherein the residual is the difference between the pseudo-range and an estimated measurement to the space vehicle at the current time period based on data from a previous time period;

determine a statistic based a comparison between residuals of the L1 and/or L2 signals and the residuals of the L5 signals;

determining the position based on the L1 and/or L2 signals and the L5 signals if the statistic is below a predetermined threshold and determining an overall position based on a subset of the signals if the statistic is not below a predetermined threshold, the subset comprising the L5 signals and wherein at least one of the L1 and/or L2 signals are excluded from the subset.

The static GNSS receiver may further comprise an RF front-end. The RF front-end may be configured to receive GNSS signals via an antenna. The signal processing unit may be configured to make GNSS measurements (pseudorange measurements, and optionally carrier range measurements) on the GNSS signals received by the RF front-end.

Optionally, the processor of the GNSS receiver is further configured to perform the steps of the previously mentioned methods of the invention.

Also provided is a base station for a communications network, comprising the GNSS receiver as described above.

Also provided is a computer program comprising computer program code configured to cause one or more processors to perform all the steps of the method as described above when said computer program is executed on said one or more processors. The one or more processors may comprise or consist of one or more processors of a GNSS receiver. The computer program may be stored on a computer-readable storage medium (optionally non-transitory).

BRIEF DESCRIPTION OF THE DRAWINGS

The invention will now be described by way of example with reference to the accompanying drawings, in which.

Figure 1:
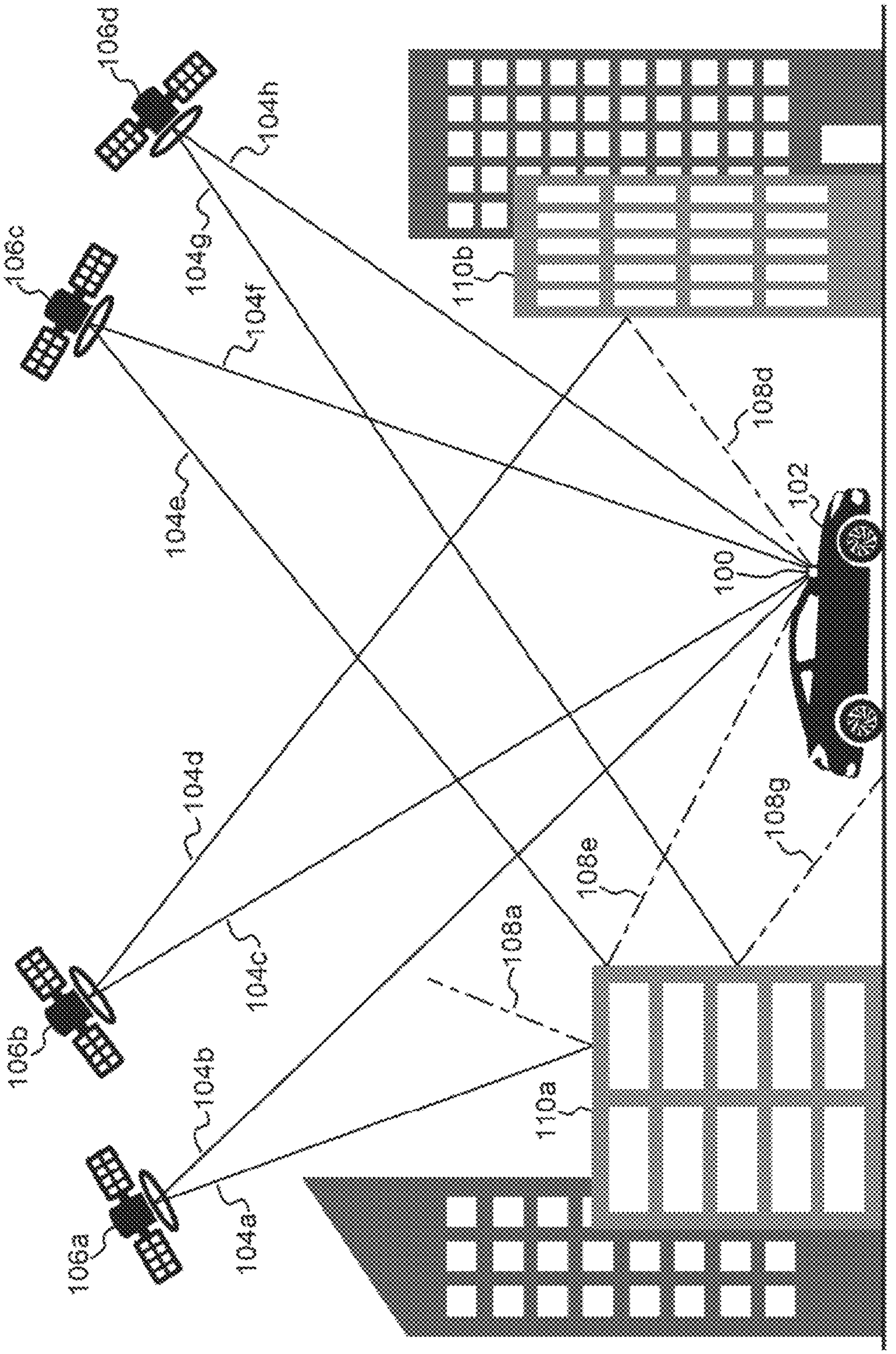
FIG. 1 is a global navigation satellite system (GNSS) in accordance with an embodiment of the present invention.

It should be noted that these figures are diagrammatic and not drawn to scale.

DETAILED DESCRIPTION

Reference will now be made in detail to examples according to the present disclosure, which are illustrated in the accompanying drawings. The scope of the present disclosure should not be construed as being limited to the descriptions given in this section; other examples may have different forms. These and other features, aspects, and advantages of the apparatus, systems and methods of the present disclosure will become better understood from the following description, appended claims, and accompanying drawings. It should be understood that the same reference numerals are used throughout the figures to indicate the same or similar parts.

The present invention provides a method of mitigating multipath interference in a global navigation satellite system (GNSS). A GNSS receiver can be configured to perform a method of mitigating multipath interference in accordance with an embodiment of the present invention. Accordingly, the present invention also provides a GNSS receiver which is configured to mitigate multipath interference in a global navigation satellite system (GNSS).

Currently there are four fully operational GNSSs: the United States' Global Positioning System (GPS), Russia's Global Navigation Satellite System (GLONASS), China's BeiDou Navigation Satellite System (BDS) and the European Union's Galileo. A GNSS receiver which can acquire and track two or more GNSSs concurrently is known as a multi-GNSS receiver.

GNSS satellites of these various systems typically transmit GNSS signals in more than one frequency band. By way of example, the frequency bands which are currently available under GPS include the L1, L2 and L5 bands. For the L1 signal band, the signal carrier frequency is generally in the range of 1.559 GHz to 1.610 GHz. For the L2 signal band, the signal carrier frequency is generally in the range of 1.18845 GHz to 1.258 GHz. And, for the L5 signal band, the signal carrier frequency is generally in the range of 1.164 GHz to 1.189 GHz. Additional or different frequency bands may become available in the future for GPS.

Different signal bands have different characteristics. L1, L2 and L5 have different chipping rates: L1 has a chipping rate of 1.023 MHz, L2 has a chipping rate of 511.5 kHz whereas L5 has a faster chipping rate of 10.23 MHz. As L5 has a faster chipping rate the peak of the correlation functions become narrower than those of L1 and L2. For example, a correlation peak of L1 corresponds to 293 m whereas a correlation peak of L5 corresponds to 29.3 m. Due to the narrower correlation functions, it is easier to distinguish between L5 signals transmitted by different paths (for example due to reflections in a multipath environment) than it is to distinguish between L1 or L2 signals transmitted by different paths. Thus, L5 signals are more resistant in multipath environments than L1 signals.

A GNSS receiver may operate in a single-band mode in which it performs signal processing to determine navigation measurements on signals in only one band, for example, the L1 band only or, as another example, the L5 band only. Alternatively, the GNSS receiver may operate in a dual- or multi-band mode in which it performs signal processing using signals in multiple bands within a particular constellation, for example, L1 and L5 dual-band mode in GPS. As another example, a GNSS receiver may be configured to operate in a multi-band mode in which three or more signal bands are utilized (e.g., L1, L2 and L5). It is generally expected that multi-band processing will achieve more accurate navigation measurements than single-band processing.

FIG. 1 illustrates a global navigation satellite system in accordance with an embodiment of the present invention. A GNSS receiver 100 located in a vehicle 102 moving within a multipath environment is shown. GNSS satellite signals 104*a-h* are transmitted from a plurality of satellites 106*a-d*. As shown, some signals from the transmitted satellite signals 104*a-h* may comprise LOS signals 104*b*, 104*c*, 104*f* and 104*h* because they travel to the GNSS receiver 100 via a direct path. Other signals from the transmitted satellite signals 104*a-h* however may comprise non-LOS signals 104*a*, 104*d*, 104*e* and 104*g* because they are reflected by obstacles within the environment. In the present example, the obstacles comprise buildings 110*a* and 110*b*. The building 110*a* reflects GNSS satellite signals 104*a*, 104*e* and 104*g* resulting in reflected satellite signals 108*a*, 108*e* and 108*g*, respectively. GNSS satellite signal 104*d* on the other hand is reflected by building 110*b*, resulting in reflected satellite signal 108*d*. Some of the reflected satellite signals may be reflected in the direction of the vehicle 102 and thus reach the GNSS receiver 100. Others on the other hand may be reflected in a different direction. In the present example, reflected GNSS satellite signals 108*d* and 108*e* are intercepted by the GNSS receiver 100 whereas reflected satellite signals 108*a* and 108*g* are reflected in different direction and are therefore not intercepted by the GNSS receiver 100. It will be apparent that more or fewer satellites may present at any one time. More particularly, GPS presently consists of at least 24 active and 3-5 spare satellites in the earth's orbit, while four satellites are generally required to uniquely determine the position of the receiver 100 in three dimensions. Reception of GNSS signals from greater than four satellites can improve position accuracy.

The satellites 106*a-d* are each configured to transmit GNSS signals 104*a-h* in two or more frequency bands. The two or more frequency bands can be selected from among the currently available bands. For example, if the GNSS receiver 100 comprises equipment for receiving and processing GPS, then GNSS receiver 100 may be configured to receive satellite signals in any two bands chosen from the L1, L2 and L5 frequency bands. Alternatively, GNSS receiver 100 may be configured to receive all three frequency bands L1, L2 and L5 of GPS. However, it will be apparent that additional or different frequency bands may become available, in which case, the satellites 106*a-d* can be configured to transmit GNSS signals 104*a-h* in any or all such frequency bands and the receiver 100 can be configured to receive and process GNSS signals 104*a-h* in any or all such bands. Accordingly, changes to the available signal frequency bands are presently contemplated as being within the scope of the present invention.

The receiver 100 is configured to receive the navigation satellite signals from the satellites 106*a-d* and to process those signals to determine a navigation solution from the received signals. In the example illustrated in FIG. 1, the receiver 100 receives and processes GNSS signals 104*b*, 104*c*, 104*d*/108*d*, 104*e*/108*e*, 104*f* and 104*h*. This includes operation in single-band mode, dual-band mode or multi-band mode with respect to at least the frequency bands L1, L2 and L5 and possibly other frequency bands.

Figure 2:
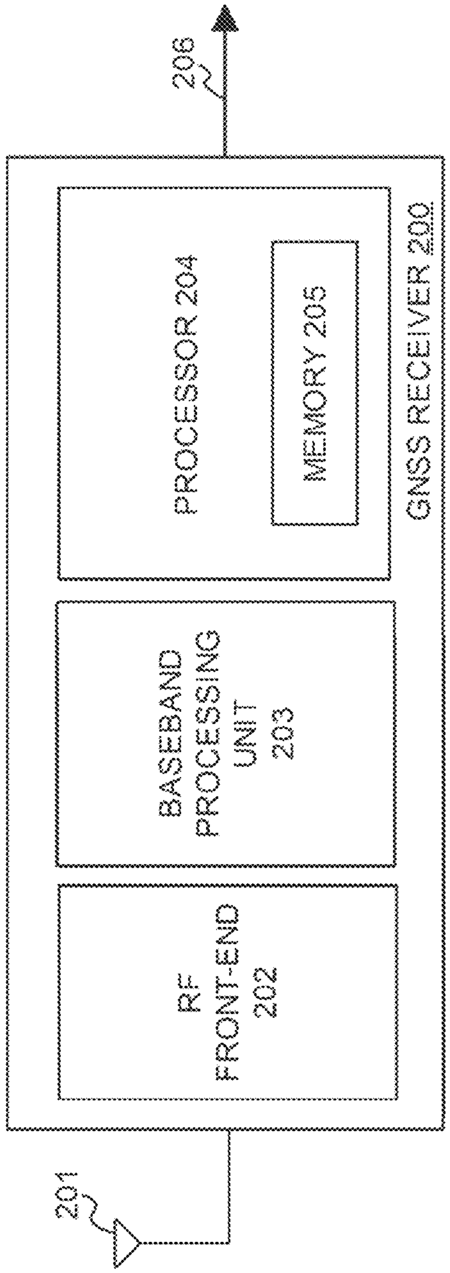
FIG. 2 is a block schematic diagram of a navigation receiver for mitigating multipath interference in accordance with an embodiment of the present invention.

FIG. 2 illustrates a block schematic diagram of a GNSS receiver 200 for mitigating multipath interference in a global navigation satellite system in accordance with an embodiment of the present invention. The receiver 200 can be identical to the GNSS receiver 100 of FIG. 1. As shown in FIG. 2, the GNSS receiver 200 is configured to receive GNSS satellite signals from GNSS satellites via an antenna 201. The received signals are passed from the antenna 201 to RF front-end 202 which performs tasks such as amplification, down-conversion, filtering and digitization of the captured satellite signals. The RF front-end 202 may include further functionality such as frequency synthesis (not shown).

The receiver 200 is further configured to process the received signals using a processor 204 to extract observables and navigation data from each channel of the baseband processing unit and to generate a navigation solution 206. The processor 204 may include an internal or external memory 205 for storing and/or retrieving data associated with the processing.

The navigation solution 206 generated by the receiver 200 may include the calculated position and velocity of the receiver 200 as well as a determination of precise GNSS time. The navigation solution may be derived from anyone, or multiple ones of, the GNSS frequency band signals received at the antenna 201, which may include GNSS signals from different GNSS constellations. The navigation solution may also take into account discounting of any one or more of the GNSS frequency band signals received at the antenna 201. More particularly, the receiver 200 receives satellite signals from one or more GNSS constellations and the processor 204 processes these signals to provide GNSS measurements such as pseudo-ranges, carrier phases, rates of pseudo-ranges, etc. to a navigation filter. The processor 204 may, for example, implement the filter, e.g., a Kalman filter or a least-squares (LSQ) filter, which is used to determine the navigation solution 206 based on the GNSS measurements.

The processor 204 may also determine whether multipath interference is likely to be present.

Figure 3:
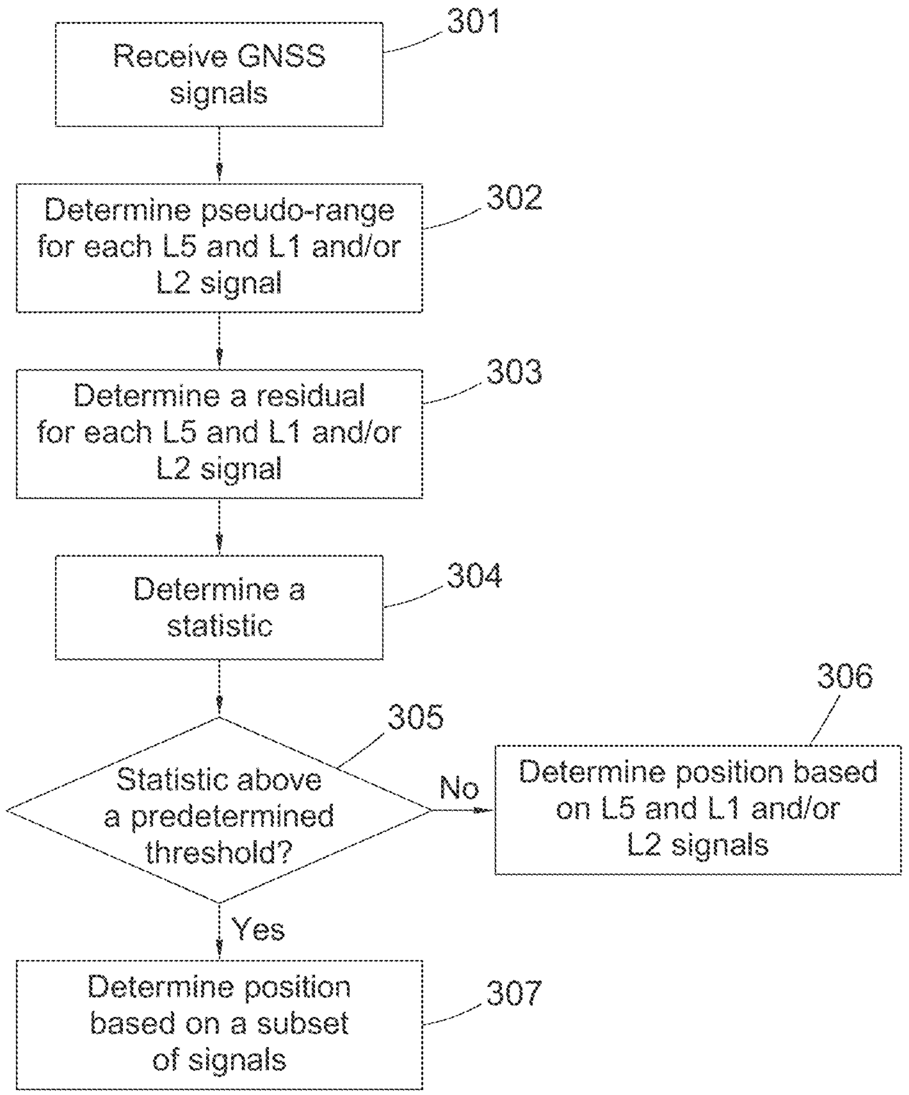
FIG. 3 is a flow diagram of a method of mitigating multipath interference in accordance with an embodiment of the present invention.

FIG. 3 illustrates a flow diagram of a method in accordance with an embodiment of the present invention. In a first step 301 GNSS signals are received from a plurality of space vehicles. A plurality of the space vehicles from which signals are received emit at least an L5 signal and an L1 and/or L2 band signal.

In a second step 302 a pseudo-range is determined for each signal for the current epoch (time period). To determine a pseudo-range, a GPS receiver compares the time a signal was transmitted by a satellite with the time it was received by the GPS receiver. The time difference tells the GPS receiver how far away that particular satellite is i.e., the pseudo-range.

In each epoch, or time period a position is determined based on a combination of pseudo-ranges from a plurality of satellites. Thus, for the previous epoch (time period) there is a determined position and velocity. Based on at least the determined position and velocity in the previous epoch an estimated measurement to the space vehicle in the current epoch can be made. The estimate includes an estimate of the current position based on the position and velocity in a previous epoch but may also include corrections due to the transmission. For each satellite, there is a corresponding estimated measurement to the space vehicle in the current epoch. In a third step 303 of the invention the difference between the estimated measurement to the space vehicle and the pseudo-range of the corresponding space vehicle can be determined.

Once residuals for all the signals have been determined a comparison can be made between the residuals of the L1 and/or L2 signals and the residuals of the L5 signals. As discussed above, the L5 signals are more resilient to multipath interference so a difference between the residuals of the L5 signals and the L1 and/or L2 signals may indicate multipath interference. In a fourth step of the invention 304 a statistic is determined based on a comparison between residuals of the L5 signals and residuals of the L1 and/or L2 signals. This statistic may be the difference in average residuals between the L5 signals and the L1 and/or L2 signals. Alternatively, it could be a ratio of the L1 and/or L2 signals to a corresponding L5 signal.

A determination is made about whether the statistic is above a predetermined threshold in step 305. If the statistic is not above a predetermined threshold, then the position is determined (306) based on both the L1 and/or L2 signals and the L5 signals. If the statistic is above the predetermined threshold, then the position is determined, 307, based on a subset of signals, the subset comprising the L5 signals with at least one of the L1 and/or L2 signals excluded from the subset. As an example, L1 and/or L2 signals from space vehicles from which there is an L5 signal may be excluded from the subset.

Some space vehicles transmit both an L5 signal and an L1 and/or L2 signal. However, other space vehicles transmit only L1 and/or L2 signals. These signals may or may not be included within the subset. The advantage of including signals from space vehicles not transmitting an L5 signal in the subset is that such a position may be more accurate as it includes information from more space vehicles. The disadvantage of including signals from space vehicles not transmitting an L5 signals in the subset is that the subset may include data heavily affected by multipath interference. In one example, L1 and/or L2 signals from space vehicles without an L5 signal are excluded from the subset. In another example, L1 and/or L2 signals from space signals without an L5 signal are excluded from the subset if their residual is above a predetermined individual threshold. Thus, signals which do not deviate significantly from the prediction are included as they are less likely to be affected by multipath interference. Signals which deviate significantly from the prediction are excluded because they are more likely to be affected by multipath interference.

If there are sufficient space vehicles transmitting L5 signals that a good position can be determined from signals from those satellites alone then it may not be necessary to include the L1 and/or L2 signals from space vehicles not transmitting an L5 signal in the subset. As an example, if the number of space vehicles transmitting L5 signals is above a predetermined threshold then signals from space vehicles not transmitting L5 signals are excluded from the subset. As a further example, the dilution of precision may be determined based on signals from the space vehicles transmitting a L5 signal and if the dilution of precision is below a threshold, then L1 and/or L2 signals from space vehicles not transmitting a L5 signal can be excluded from the subset.

In one example, the elevation angle of space vehicles transmitting only an L1 and/or L2 signal (and not a L5 signal) is determined. If the angle of elevation of the corresponding space vehicle is below a predetermine elevation threshold, then the L1 and/or L2 signal is excluded from the subset.

The statistic may relate to a combination of L5 signals and a combination of L1 and/or L2 signals or alternatively may compare specific L5 signals with specific L1 and/or L2 signals. Depending on the elevation angle of individual space vehicles signals from different space vehicles may be affected by multipath interference to a greater or lesser extent.

An example of a comparison between individual signal is a comparison between a residual of a L5 signal from a specific space vehicle and a residual of a L1 and/or L2 signal from the same specific space vehicle to determine a difference between the two residuals. The determination step 306 then comprises determining whether the difference in residuals is greater than a predetermined difference threshold. The percentage of space vehicles for which the ratio is over the predetermined difference threshold is then determined. If the percentage is greater than a predetermined percentage threshold, then the environment is deemed to be affected by multipath interference and the position is determined based on a subset of signals comprising the L5 signals excluding at least one of the L1 and/or L2 signals. A further statistic, based on signals from individual space vehicles may be determined and individual L1 and/or L2 signals excluded on the basis of the statistic based on signals from the respective space vehicle.

A further example of comparison between individual signals is a comparison between a residual of a L5 signal from a specific space vehicle and a residual of a L1 and/or L2 signal from the same specific space vehicle to determine a ratio of the two residuals. The determination step 306 then comprises determining whether the difference is greater than a predetermined ratio threshold. The percentage of space vehicles for which the ratio is over the predetermined ratio threshold is then determined. If the percentage is greater than a predetermined percentage threshold, then the environment is deemed to be affected by multipath interference and the position is determined based on a subset of signals comprising the L5 signals excluding at least one of the L1 and/or L2 signals. A further statistic, based on signals from individual space vehicles may be determined and individual L1 and/or L2 signals excluded on the basis of the statistic based on signals from the respective space vehicle.

Alternatively, the statistic may relate to the group properties of the L5 signals as a whole compared the group properties of the L1 and/or L2 signals as a whole (from satellite vehicles transmitting both a L5 signal and a L1 and/or L2 signal). In one example, an average residual for all the L5 signals is determined and an average residual for all the L1 and/or L2 signals determined. The difference between the residual for the L5 signals and the residual from the L1 and/or L2 signals is compared and if it is greater than a predetermined average distance threshold the environment is considered affected by multipath interference and the position is calculated based on a subset excluding at least on L1 and/or L2 signal.

The statistic can be any statistic which compares the residuals of one or more L5 signals with one or more L1 and/or L2 signals. An example of an alternative statistic is the standard deviation of all the residuals. In the statistic determining step the standard deviation of all the results is determined. The standard deviation indicates the spread of results so a large spread may indicate a large amount of variation in the residuals and therefore a multipath environment. The standard deviation is compared to a predetermined standard deviation threshold to determine whether it is a multipath environment. Alternatively, in another favourable embodiment the statistic to be determined may be based on or is a combination of one or more of the same and/or different statistics previously mentioned.

Alternatively, a multipath environment may be detected using a statistic based on signals from a plurality of signals. Then, if a multipath environment is detected a further statistic evaluated (using the methods above) based on signals from a single space vehicle and individual L1 and/or L2 signals excluded based on the statistic from the single space vehicle.

This method may only be applicable if the number of space vehicles transmitting an L5 and an L1 and/or L2 signal is sufficiently significant. Therefore, a test may be performed in which the number of space vehicles transmitting a L5 and a L1 and/or L2 signal is determined. The method of mitigating a multipath environment described above is only carried out if the number of space vehicles transmitting a L5 and a L1 and/or L2 signal is above a predetermined threshold. If it is not above a predetermined threshold, then a conventional position determination (without the multipath mitigation method described above) is carried out.

The dilution of precision refers to the dilution in precision of the determined position if one or more signals are removed from the position determination. If the dilution of precision is large, then the method described herein may not be suitable because the loss of precision would be too significant. Thus, the dilution of precision of the space vehicles may be determined. If (and only if) the dilution of precision is below a predetermined dilution of precision threshold the method described above is carried. If the dilution of precision is not below the predetermined dilution of precision threshold, then the position is determined using all the available signals.

If the there is a significant discrepancy between the predicted position and the position based on the pseudo-range(s) then there may be another underlying error and it may not be suitable to use this method. Thus, the average of all residuals may be determined. If the average of all the residuals is below a maximum average residual value, the method may be carried out. However, if the average of all the residuals is not below a maximum average residual the position may be determined using all the available signals.

A GNSS receiver comprises a signal processing unit and a processor configured to carry out the steps described above. The GNSS receiver may form part of a base station for a communications network It should be understood that when the phrase "number of space vehicles" is used it refers to the number of space vehicles from which signals are received at the given position at that point in time.

It should be understood that the scope of the present disclosure is not limited to the examples described above. Many variations will be apparent to those skilled in the art, based on the foregoing description.

In general, in the flowcharts of FIGS. 3, the arrows between the steps do not necessarily imply a causal relationship between those steps. They merely indicate one exemplary order in which the steps may be performed. Method steps may be carried out in a different order from the exemplary order shown in the drawings.

Figure 4:
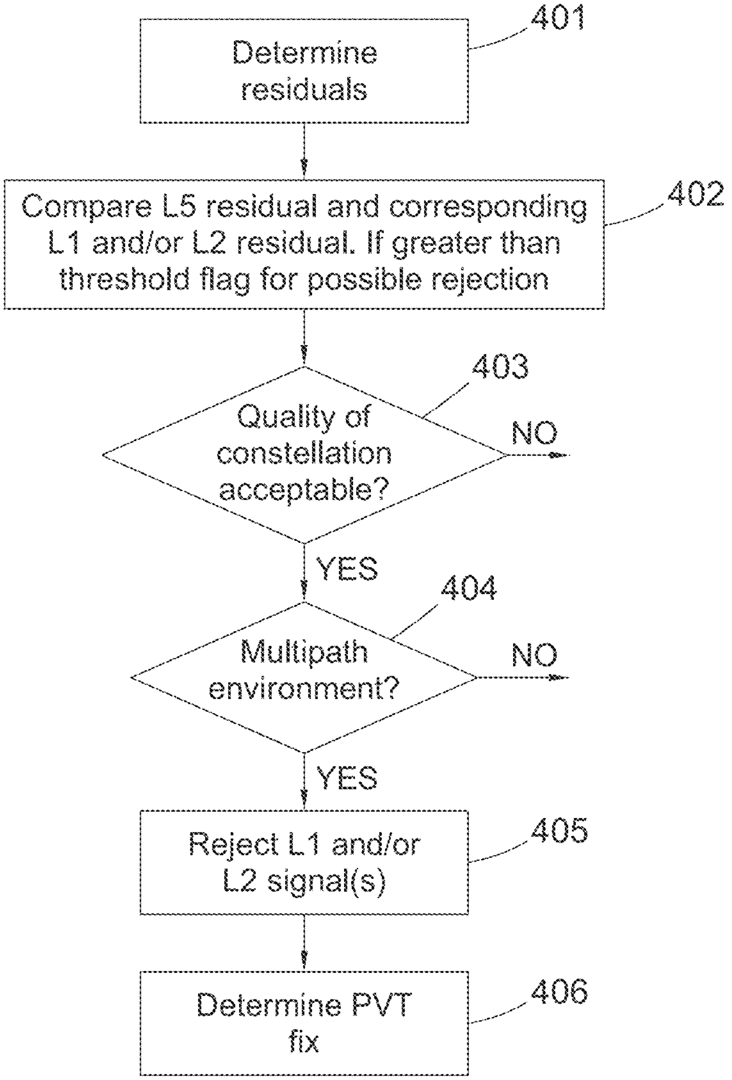
FIG. 4 is a flow diagram of an example method according to an embodiment of the present invention.

A further method is depicted in FIG. 4. Residuals for each signal are determined using a method as described above, in step 401. In step 402 the residual of an L5 signal and an L1 and/or L2 signal for the same space vehicle are compared. If the difference between the residuals is greater than a predetermined threshold, then the L1 and/or L2 signals are flagged as candidates for rejection.

In step 403 the quality of the constellation as a whole is assessed. This can be by comparing the number of satellites transmitting an L5 and L1 and/or L2 signal. It can also, or alternatively be by assessing the maximum dilution of precision.

If the assessment of the constellation is passed, then an assessment about the environment is performed at step 404. This can be by one or both of the following methods:

a) Compute the percentage of signals flagged as candidates for rejection at step 403 and compare to a threshold;

b) Compute the mean band residual for the L5 signals and the mean band residual for the L1 and/or L2 signals and compare to a threshold;

If one or both of these conditions is fulfilled then the environment is dominated by multipath.

At step 405 L1 and/or L2 signals are rejected. This may be all L1 and/or L2 signals, or only L1 and/or L2 signals from a space vehicle with an L5 signal or only L1 and/or L2 signals with residuals larger than a threshold.

At step 406 a PVT (position, velocity, time) fix is determined using signals not excluded in step 405.

If, at step 404, the environment is determined not to be dominated by multipath then the signals flagged at step 402 can be excluded as these are the signals for which there is a discrepancy between the residuals from the L5 signal and the L1 and/or L2 signal. A PVT fix can be determined using the signals except for these.

It should be noted that the term "above" could equally be replaced with "below" for a particular threshold.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of mitigating multipath interference in a global navigation satellite system (GNSS) receiver, the method comprising:

receiving GNSS signals from a plurality of space vehicles which emit at least an L5 signal and an L1 and/or L2 band signal;

determining, for each L5 signal and L1 and/or L2 signal, a pseudo-range based on the signal;

determining a residual for each L5 signal and L1 and/or L2 signal from each space vehicle, wherein the residual is the difference between the pseudo-range and a range from a predicted position of the receiver to the space vehicle based on data from a previous time period;

determining a statistic based on a comparison between residuals of the L1 and/or L2 signals and the residuals of the L5 signals;

determining a position of the receiver based on a subset of the signals when the statistic is above a predetermined threshold or determining an overall position based on at least the L1 and/or L2 signals and the L5 signals when the statistic is not above a predetermined threshold, the subset comprising the L5 signals and wherein at least one of the L1 and/or L2 signals are excluded from the subset.

2. A method according to claim 1 wherein the statistic is above the predetermined threshold, and all L1 and/or L2 signals from space vehicles from which there is also a L5 signal are excluded from the subset.

3. A method according to claim 1 wherein the statistic is above the predetermined threshold, and the difference between the L1 and/or L2 signal residual and the L5 signal residual is greater than a predetermined individual distance threshold, wherein L1 and/or L2 signals from space vehicles from which there is also a L5 signal are excluded from the subset.

4. A method according to claim 1 wherein the statistic is above the predetermined threshold, and the L1 and/or L2 signal residual and the L5 signal residual are above a predetermined individual residual threshold, wherein L1 and/or L2 signals from space vehicles without an L5 signal are excluded from the subset.

5. A method according to claim 1 wherein the statistic is above the predetermined threshold, the method further comprising determining an elevation angle for L1 and/or L2 signals from space vehicles without an L5 signal, wherein the angle of elevation of the corresponding space vehicle is below a predetermined elevation threshold, and the L1 and/or L2 signal is excluded from the subset.

6. A method according to claim 1 wherein determining the statistic comprises:

determining a ratio of the residual for the L1 and/or L2 signal to the residual for the L5 signal from the same space vehicle for each space vehicle;

determining, for each space vehicle, whether the ratio of residuals is over a predetermined ratio threshold;

determining whether the percentage of space vehicles having a ratio over the predetermined ratio threshold is greater than a predetermined percentage threshold.

7. A method according to claim 1 wherein determining the statistic comprises:

determining a difference of the residual for the L1 and/or L2 signal to the residual for the L5 signal from the same space vehicle for each space vehicle;

determining, for each space vehicle, whether the difference in residuals is over a predetermined difference threshold;

determining whether the percentage of space vehicles having a difference over a predetermined difference threshold is greater than a predetermined difference threshold.

8. A method according to claim 1 wherein determining the statistic comprises:

determining an average residual for all the L1 and/or L2 signals;

determining an average residual for all the L5 signals;

determining whether the difference between the residual for all the L1 and/or L2 signals and the average residual for all the L5 signals is greater than a predetermined average distance difference threshold.

9. A method according to claim 1 wherein determining the statistic comprises:

determining a standard deviation of the residuals;

determining whether the standard deviation is above a predetermined standard deviation threshold.

10. A method of determining an overall position comprising:

determining a number of space vehicles transmitting a L5 and a L1 and/or L2 signal is greater than a predetermined space vehicle number threshold; and responsive to determining that the number of space vehicles is greater than the predetermined space vehicle number threshold, carrying out the method of claim 1.

11. A method of determining an overall position comprising:

determining a dilution of precision of space vehicles is below a predetermined dilution of precision threshold;

responsive to determining that the dilution of precision is below the predetermined dilution of precision threshold, carrying out the method of claim 1.

12. A method according to claim 1 further comprising:

comparing each residual to a maximum threshold and determining that at least one residual is below the maximum threshold;

responsive to determining that at least one residual is below the maximum threshold, performing, for each residual that is below the maximum threshold, the determining a statistic and the determining the position.

13. A global navigation satellite system (GNSS) receiver comprising:

a signal processing unit configured to track GNSS signals and produce GNSS measurements from the GNSS signals; and at least one processor, configured to:

determine, for each L5 signal and L1 and/or L2 signal, a pseudo-range based on the signal;

determine a residual for each L5 signal and L1 and/or L2 signal from each space vehicle, wherein the residual is the difference between the pseudo-range and a range from a predicted position of the receiver to the space vehicle based on data from a previous time period;

determine a statistic based a comparison between residuals of the L1 and/or L2 signals and the residuals of the L5 signals;

determine an overall position based on the L1 and/or L2 signals and the L5 signals under a condition in which the statistic is below a predetermined threshold and determine a position of the receiver based on a subset of the signals under the condition in which the statistic is not below a predetermined threshold, the subset comprising the L5 signals and wherein at least one of the L1 and/or L2 signals are excluded from the subset.

14. A GNSS receiver according to claim 13, wherein the at least one processor is further configured to determine the statistic by performing operations including:

determining a ratio of the residual for the L1 and/or L2 signal to the residual for the L5 signal from the same space vehicle for each space vehicle;

determining, for each space vehicle, whether the ratio of residuals is over a predetermined ratio threshold;

determining whether the percentage of space vehicles having a ratio over the predetermined ratio threshold is greater than a predetermined percentage threshold.

15. A base station for a communications network, the base station comprising the GNSS receiver of claim 13.

16. A GNSS receiver according to claim 13, wherein the at least one processor is further configured to determine the statistic by performing operations including:

determining a difference of the residual for the L1 and/or L2 signal to the residual for the L5 signal from the same space vehicle for each space vehicle;

determining, for each space vehicle, whether the difference in residuals is over a predetermined difference threshold;

determining whether the percentage of space vehicles having a difference over a predetermined difference threshold is greater than a predetermined difference threshold.

17. A GNSS receiver according to claim 13, wherein the at least one processor is further configured to determine the statistic by performing operations including:

determining an average residual for all the L1 and/or L2 signals;

determining an average residual for all the L5 signals;

determining whether the difference between the residual for all the L1 and/or L2 signals and the average residual for all the L5 signals is greater than a predetermined average distance difference threshold.

18. A GNSS receiver according to claim 13, wherein the at least one processor is further configured to determine the statistic by performing operations including:

determining a standard deviation of the residuals;

determining whether the standard deviation is above a predetermined standard deviation threshold.

19. A GNSS receiver according to claim 13, wherein the at least one processor is further configured such that if the statistic is above the predetermined threshold, all L1 and/or L2 signals from space vehicles from which there is also a L5 signal are excluded from the subset.

20. A GNSS receiver according to claim 13, wherein the at least one processor is further configured such that if the statistic is above the predetermined threshold, and the difference between the L1 and/or L2 signal residual and the L5 signal residual is greater than a predetermined individual distance threshold, L1 and/or L2 signals from space vehicles from which there is also a L5 signal are excluded from the subset.

* * * * *